United States Patent
Lewis et al.

(10) Patent No.: US 9,535,683 B2
(45) Date of Patent: *Jan. 3, 2017

(54) REGISTRATION NOTIFICATION FOR MOBILE DEVICE MANAGEMENT

(71) Applicant: AT&T Mobility II LLC, Atlanta, GA (US)

(72) Inventors: John Lewis, Lawrenceville, GA (US); James Payne, Woodstock, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/491,579

(22) Filed: Sep. 19, 2014

(65) Prior Publication Data

US 2015/0007162 A1    Jan. 1, 2015

Related U.S. Application Data

(60) Division of application No. 13/476,528, filed on May 21, 2012, now Pat. No. 8,868,696, which is a (Continued)

(51) Int. Cl.
*G06F 9/44*   (2006.01)
*G06F 9/445*   (2006.01)
(Continued)

(52) U.S. Cl.
CPC ............ *G06F 8/65* (2013.01); *G06Q 30/018* (2013.01); *H04W 8/245* (2013.01); *H04W 12/08* (2013.01);
(Continued)

(58) Field of Classification Search
None
See application file for complete search history.

(56) References Cited

U.S. PATENT DOCUMENTS 6,078,956 A    6/2000   Bryant et al.
6,970,917 B1   11/2005  Kushwaha et al.
(Continued)

OTHER PUBLICATIONS

Office Action dated Nov. 10, 2011 for U.S. Appl. No. 12/327,498, 37 pages.
(Continued)

*Primary Examiner* — Lewis A Bullock, Jr.
*Assistant Examiner* — Mark Gooray
(74) *Attorney, Agent, or Firm* — Amin, Turocy & Watson, LLP

(57) ABSTRACT

Notification of registration of a mobile device with femto coverage for firmware content management is provided. An attachment component that administers location of mobile devices or a femto access point (AP) conveys a notification to a network platform that manages firmware content updates when a mobile device for which firmware update is available hands off from wireless macro coverage onto femto coverage through the femto AP. The notification is triggered in response to firmware update notification received by the attachment component, or an update flag received by the femto AP. Upon reception of the notification, to exploit wireline bandwidth, the network platform delivers firmware content(s) update through backhaul link to the femto AP to which the mobile device is registered. Femto APs not provisioned to serve a mobile device can be incentivized to authorize the mobile device for coverage and thus facilitate firmware updates.

20 Claims, 9 Drawing Sheets

Related U.S. Application Data continuation of application No. 12/327,498, filed on Dec. 3, 2008, now Pat. No. 8,204,968.

(51) Int. Cl.
| | |
|---|---|
| *H04W 40/00* | (2009.01) |
| *H04W 40/36* | (2009.01) |
| *G06Q 30/00* | (2012.01) |
| *H04W 8/24* | (2009.01) |
| *H04W 12/08* | (2009.01) |
| *H04W 8/02* | (2009.01) |
| *H04W 84/04* | (2009.01) |
| *H04W 36/04* | (2009.01) |

(52) U.S. Cl.
CPC ............. *H04W 40/00* (2013.01); *H04W 40/36* (2013.01); *H04W 8/02* (2013.01); *H04W 36/04* (2013.01); *H04W 84/045* (2013.01)

(56) References Cited

U.S. PATENT DOCUMENTS

| | | | | |
|---|---|---|---|---|
| 7,143,189 B2* | 11/2006 | Cohen | ............... | G06F 17/30893 707/E17.117 |
| 7,146,412 B2 | 12/2006 | Turnbull | | |
| 7,293,169 B1 | 11/2007 | Righi et al. | | |
| 7,343,408 B2 | 3/2008 | Kushwaha et al. | | |
| 7,480,907 B1* | 1/2009 | Marolia | .................... | G06F 8/65 717/127 |
| 7,831,693 B2 | 11/2010 | Lai et al. | | |
| 7,890,427 B1 | 2/2011 | Rao et al. | | |
| 8,855,620 B2* | 10/2014 | Sievers | .................... | G06F 8/65 455/419 |
| 2005/0124332 A1* | 6/2005 | Clark | ........................ | G06F 8/65 455/419 |
| 2005/0144616 A1 | 6/2005 | Hammond et al. | | |
| 2005/0181776 A1 | 8/2005 | Verma et al. | | |
| 2006/0217111 A1* | 9/2006 | Marolia | .................... | G06F 8/65 455/418 |
| 2008/0003991 A1* | 1/2008 | Sievers | .................... | G06F 8/65 455/418 |
| 2008/0040713 A1 | 2/2008 | Subbakrishna et al. | | |
| 2008/0070601 A1 | 3/2008 | Brueckheimer et al. | | |
| 2008/0076420 A1 | 3/2008 | Khetawat et al. | | |
| 2008/0160955 A1 | 7/2008 | Giesecke | | |
| 2008/0160983 A1 | 7/2008 | Poplett et al. | | |
| 2008/0310324 A1 | 12/2008 | Chaponniere | | |
| 2009/0070756 A1* | 3/2009 | Wei | .......................... | G06F 8/65 717/172 |
| 2009/0094351 A1 | 4/2009 | Gupta et al. | | |
| 2009/0131050 A1 | 5/2009 | Osborn | | |
| 2009/0320012 A1* | 12/2009 | Lee | .......................... | G06F 8/65 717/168 |
| 2010/0057924 A1 | 3/2010 | Rauber et al. | | |
| 2010/0113067 A1* | 5/2010 | Fullam | .................. | H04W 4/021 455/456.3 |
| 2010/0130170 A1 | 5/2010 | Liu et al. | | |

OTHER PUBLICATIONS

Office Action dated Aug. 29, 2012 for U.S. Appl. No. 13/476,528, 42 pages.

Office Action dated Dec. 18, 2012 for U.S. Appl. No. 13/476,528, 46 pages.

Office Action dated Mar. 20, 2014 for U.S. Appl. No. 13/476,528, 57 pages.

* cited by examiner

REGISTRATION NOTIFICATION FOR MOBILE DEVICE MANAGEMENT

CROSS-REFERENCE TO RELATED CASES

This application is a divisional application of, and claims the benefit of priority to each of, U.S. patent application Ser. No. 13/476,528, and filed May 21, 2012, and entitled REGISTRATION NOTIFICATION FOR MOBILE DEVICE MANAGEMENT, which is a continuation of U.S. patent application Ser. No. 12/327,498, entitled REGISTRATION NOTIFICATION FOR MOBILE DEVICE MANAGEMENT, and filed on Dec. 3, 2008. The entireties of these applications are hereby incorporated herein by reference.

TECHNICAL FIELD

The subject application relates to wireless communications and, more particularly, to notification of registration of a mobile device within femto coverage area for device content management.

BACKGROUND

In wireless telecommunication, access to radiofrequency (RF) bands is regulated and largely bureaucratic. Even in instances in which a RF band can be utilized for wireless operation without a license, like the 2.4 GHz Industrial, Scientific and Medical band, frequency resources remain limited while demand is high. In addition, transmission power for a network transmitter is regulated. Accordingly, wireless telecommunication development focuses on efficient approaches to maximize operational and commercial utility, e.g., maximize a number of served subscribers through finite resources, without deteriorating subscriber perceived quality of service, while collecting revenue via delivery of billable content traffic. A ubiquitous approach to increasing utility is to mitigate traffic and signaling overhead on the air-interface in order to increase network capacity.

Among traffic overhead is transmission of firmware over-the-air (FOTA) updates, whether critical updates or non-urgent business-as-usual (BAU) updates, which typically are necessary for maintenance and improvement of wireless device performance. It should be appreciated that FOTA updates can incur substantial signaling since large updates can demand significant retry cycles depending on radio link conditions. Moreover, delivery on a wireless link of large FOTA updates can display substantive failure rate, with the ensuing need to resend the update. Furthermore, FOTA updated can be slow since such traffic generally is non-billable and typically is scheduled limited radio resources. Further yet, to compound issues related to communication of FOTA updates, large service providers or network operators often manage FOTA updates for a substantive number (e.g., $10^5$-$10^9$) of devices, thus incurring significant undesired overhead on the service provider's radio resources when updates are implemented. Therefore, efficient approaches to mobile device management can improve traffic conditions and mitigate radio resources employed for FOTA updates; thus, improving service provider operation and commercial utilities.

DETAILED DESCRIPTION

Figure 1:
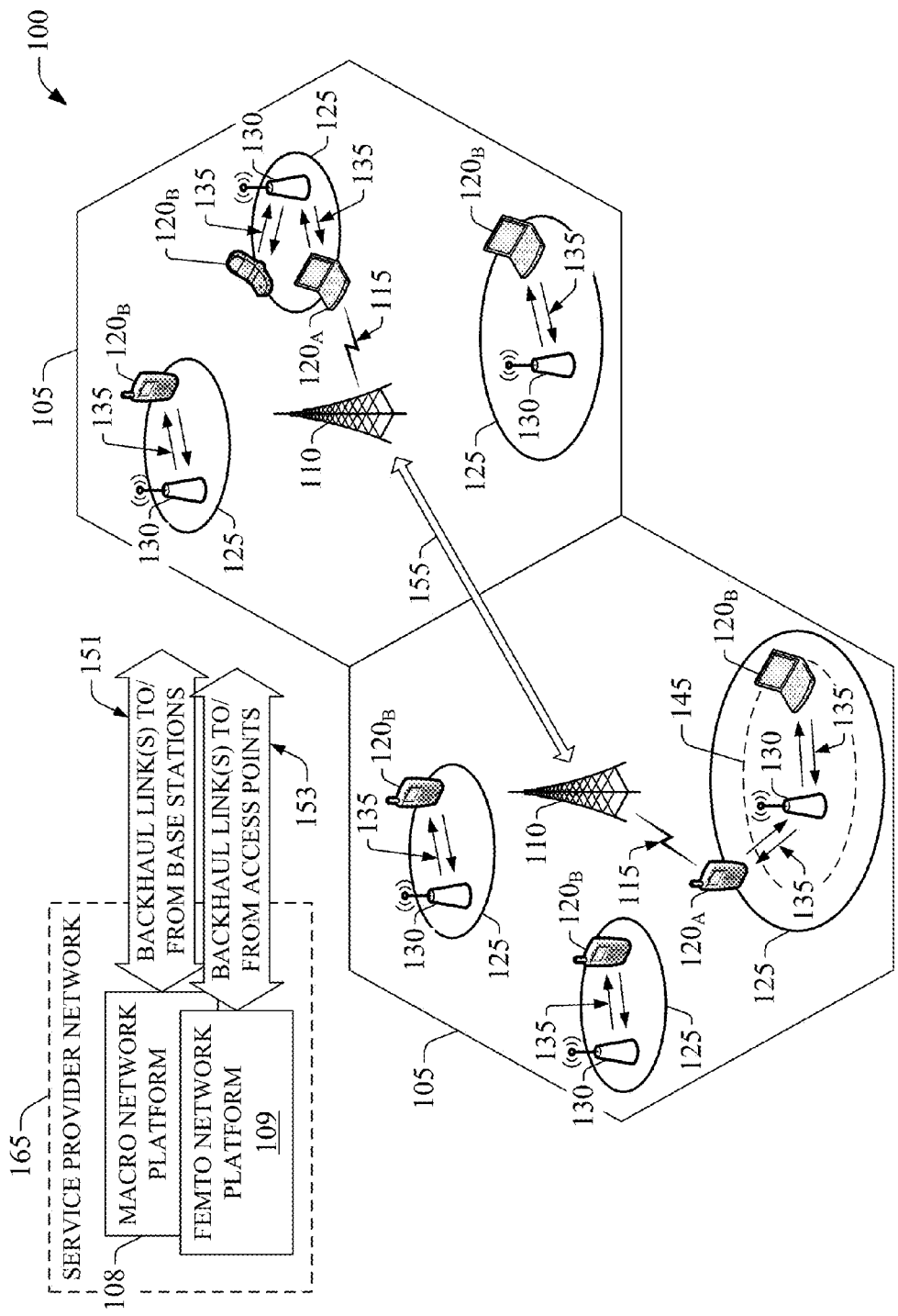
FIG. 1 illustrates a schematic wireless telecommunication environment in which telecommunication can exploit features and aspects described in the subject specification.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "system," "platform," "service," "framework," "interface," and the like are intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment," "mobile station," "mobile," subscriber station," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B (HNB)," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," "agent," and the like are employed interchangeably throughout the subject specification, unless context warrants particular distinction(s) among the terms. It should be appreciated that such terms can refer to human entities or automated components supported through artificial intelligence (e.g., a capacity to make inferences based on complex mathematical formalisms) which can provide simulated vision, sound recognition, and so forth.

The subject innovation provides system(s) and method(s) for notification of registration of a mobile device within femto coverage area for device content management. Content can be firmware associated with functionalities of the mobile device. In an aspect of the subject innovation, non-urgent business-as-usual BAU firmware content updates are suited to be managed as described herein. It is noted that other non-critical content such as multimedia (e.g., video and sound) content can be delivered in accordance with aspects of the subject innovation. In an aspect, of the subject innovation, a notification is conveyed to a network component or platform that manages firmware content(s) updates when a mobile device for which an update is available, hands off from wireless macro network coverage onto a femto cell coverage. The notification is delivered in response to a firmware update notification delivered to a component that administers location of the mobile device, or an update flag delivered to a femto access point that can provide femto coverage to the mobile device. Upon reception of the notification, to take advantage of the wireline network bandwidth over the wireless macro coverage counterpart, the network component or platform that manages firmware updates delivers firmware content(s) update through backhaul link to a femto access point to which the intended mobile device is registered.

In an aspect, when a new non-urgent BAU firmware update required for a mobile device becomes available, a mobile device management platform identifies whether the mobile device can attain femto access coverage, e.g., through data inspection or extraction form a subscriber database or provisioning database. When the device is authorized to access a femto access point either provisioned to a subscriber linked to the mobile device, or allowed access as a part of a network of firmware update femto access points, an attachment component that can manage macro-to-femto handover conveys a notification to the mobile device management platform when the mobile device registers with an authorized femto access point. The notification triggers delivery of a firmware update to the femto cell that provides coverage to the mobile device. Alternatively, or in addition, when the attachment component determines the device is not covered through a femto cell, but rather via macro coverage, the firmware update is delayed.

To increase a number of provisioned femto access points that can facilitate coverage to a mobile device, and firmware content(s) updates related therewith, a MDM component can identify a set of femto APs within a location pattern of the mobile device, and prompt subscribers to whom respective femto APs are provisioned to authorize access to femto coverage in the respective femto APs. Resources to effect firmware content(s) updates are negotiated and configured with femto APs that indicate a subscriber has opted in. To drive inclusion, subscribers that opt in are provided with monetized incentives.

It is noted that the various aspects or features described in the subject specification can be exploited in substantially any, or any, wireless technology such second generation (2G) technology; e.g., Global System for Mobile Communications (GSM), or advanced second generation (2.5G) telecommunication technology, e.g., Enhanced Data Rate for GSM Evolution (EDGE); third generation technology (3G) like Third Generation Partnership Project (3GPP) Universal Mobile Telecommunication System (UMTS), 3GPP Long Term Evolution (LTE), Wideband Code Division Multiple Access (W-CDMA), or Ultra-broadband Mobility (UMB); advanced 3G such as Worldwide Interoperability for Microwave Access (WiMax); or fourth generation (4G) technology such as for example Long Term Evolution (LTE) Advanced Referring to the drawings, FIG. 1 illustrates a wireless environment that includes macro cells and femto cells for wireless coverage in accordance with aspects described herein. In wireless environment 100, two areas 105 represent "macro" cell coverage, each macro cell is served by a base station 110. It should be appreciated that macro cells 105 are illustrated as hexagons; however, macro cells can adopt other geometries generally dictated by the deployment or floor plan, geographic areas to be covered (e.g., a metropolitan statistical area (MSA) or rural statistical area (RSA)), and so on. Macro coverage is generally intended to serve mobile wireless devices, like UE $120_A$, in outdoors locations. An over-the-air wireless link 115 provides such coverage, the wireless link 115 comprises a downlink (DL) and an uplink (UL), and utilizes a predetermined band of the radio frequency (RF) spectrum. As an example, UE $120_A$ can be a Third Generation Partnership Project (3GPP) Universal Mobile Telecommunication System (UMTS) mobile phone. It is noted that a base station, its associated electronics, circuitry or components, and a wireless link operated in accordance to the base station form a radio access network (RAN). In addition, base station 110 communicates via backhaul link(s) 151 with a macro network platform 108, which in cellular wireless technologies (e.g., 3rd Generation Partnership Project (3GPP) Universal Mobile Telecommunication System (UMTS), Global System for Mobile Communication (GSM)) represents a core network. In an aspect, macro network platform 108 controls a set of base stations 110 that serve either respective cells or a number of sectors within such cells. Macro network platform 108 also communicates with other base stations (not shown) that serve other cells (not shown). Backhaul link(s) 151 can include a wired backbone link (e.g., optical fiber backbone, twisted-pair line, T1/E1 phone line, a digital subscriber line (DSL) either synchronous or asynchronous, an asymmetric ADSL, or a coaxial cable . . . ). Backhaul pipe(s) 155 link disparate base stations 110.

In wireless environment 100, within one or more macro coverage cell 105, a set of femto cell 125 served by respective femto access points (APs) 130 can be deployed. While in illustrative wireless environment 100 three femto cells are deployed per macro cell, aspects of the subject innovation are geared to femto cell deployments with substantive femto AP density, e.g., $10^4$-$10^8$ femto APs 130 per base stations 110. A femto cell 125 typically covers an area that includes confined area 145, which is determined, at least in part, by transmission power allocated to femto AP 130, path loss, shadowing, and so forth. While coverage area 125 and confined area 145 typically coincide, it should be appreciated that in certain deployment scenarios, coverage area 125 can include an outdoor portion (e.g., a parking lot, a patio deck, a recreation area such as a swimming pool and nearby space) while area 145 spans an enclosed living space. Coverage area typically is spanned by a coverage radius that ranges from 20 to 100 meters. Confined coverage area 145 is generally associated with an indoor space such as a building, either residential (e.g., a house, a condominium, an apartment complex) or business (e.g., a library, a hospital, a retail store), which encompass a setting that can span about 5000 sq. ft.

A femto AP 130 typically serves a few (for example, 1-5) wireless devices (e.g., subscriber station $120_B$) within confined coverage area 125 via a wireless link 135 which encompasses a downlink and an uplink. A femto network platform 109 can control such service, in addition to mobility handover from macro-to-femto handover and vice versa, and registration and provisioning of femto APs. Control, or management, is facilitated by backhaul link(s) 153 that connect deployed femto APs 130 with femto network platform 109. Backhaul pipe(s) 153 are substantially the same as backhaul link(s) 151. In an aspect of the subject innovation, part of the control effected by femto AP 130 measurements of radio link conditions and other performance metrics. Femto network platform 109 also includes components, e.g., nodes, gateways, and interfaces, that facilitates packet-switched (PS) (e.g., internet protocol (IP)) traffic and signaling generation for networked telecommunication. It should be appreciated that femto network platform 109 can be femto AP 130 can integrate seamlessly with substantially any packet switched (PS)-based and circuit switched (CS)-based network such as macro network platform 108. Thus, operation with a wireless device such as $120_A$ is substantially straightforward and seamless when handover from femto-to-macro, or vice versa, takes place. As an example, femto AP 130 can integrate into an existing 3GPP Core Network via conventional interfaces, or reference links, like Iu-CS, Iu-PS, Gi, Gn.

It is to be noted that substantially all voice or data active sessions associated with subscribers within femto cell coverage (e.g., area 125) are terminated once the femto AP 130 is shut down; in case of data sessions, data can be recovered at least in part through a buffer (e.g., a memory) associated with a femto gateway at the femto network platform. Coverage of a suspended or hotlined subscriber station or associated account can be blocked over the air-interface. However, if a suspended or hotlined customer who owns a femto AP 130 is in Hotline/Suspend status, there is no substantive impact to the customers covered through the subject femto AP 130. In another aspect, femto AP 130 can exploit high-speed downlink packet access either via an interface with macro network platform 108 or through femto network platform 109 in order to accomplish substantive bitrates.

In addition, in yet another aspect, femto AP 130 has a LAC (location area code) and RAC (routing area code) that is different from the underlying macro network. These LAC and RAC are used to identify subscriber station location for a variety of reasons, most notably to direct incoming voice and data traffic to appropriate paging transmitters, and emergency calls as well. As a subscriber station (e.g., UE $120_A$) that exploits macro coverage (e.g., cell 105) enters femto coverage (e.g., area 125), the subscriber station (e.g., UE $120_A$) attempts to attach to the femto AP 130 through transmission and reception of attachment signaling. The signaling is effected via DL/UL 135; in an aspect of the subject innovation, the attachment signaling can include a Location Area Update (LAU) and/or Routing Area Update (RAU). Attachment attempts are a part of procedures to ensure mobility, so voice calls and data sessions can continue even after a macro-to-femto transition or vice versa. It is to be noted that UE $120_A$ can be employed seamlessly after either of the foregoing transitions. In addition, femto networks typically are designed to serve stationary or slow-moving traffic with reduced signaling loads compared to macro networks. A femto service provider (e.g., an entity that commercializes, deploys, or utilizes femto access point 130) is therefore inclined to minimize unnecessary LAU/RAU signaling activity at substantially any opportunity to do so, and through substantially any available means. It is to be noted that substantially any mitigation of unnecessary attachment signaling/control is advantageous for femto cell operation. Conversely, if not successful, UE $120_A$ is generally commanded (through a variety of communication means) to select another LAC/RAC or enter "emergency calls only" mode. It is to be appreciated that this attempt and handling process can occupy significant UE battery, and femto AP capacity and signaling resources (e.g., communication of pilot sequences) as well.

When an attachment attempt is successful, UE $120_A$ is allowed on femto cell 125, and incoming voice and data traffic are paged and routed to the subscriber through the femto AP 130. To facilitate voice and data routing, and control signaling as well, successful attachment can be recorded in a memory register, e.g., a Visited Location Register (VLR), or substantially any data structure stored in a network memory. It is to be noted also that packet communication (e.g., voice and data traffic, and signaling) typically paged/routed through a backhaul broadband wired network backbone 140 (e.g., optical fiber backbone, twisted-pair line, T1/E1 phone line, digital subscriber line (DSL) either synchronous or asynchronous, an asymmetric DSL, a coaxial cable . . . ). To this end, femto AP 130 is typically connected to the broadband backhaul network backbone 140 via a broadband modem (not shown). In an aspect of the subject innovation, femto AP 130 can display status indicators for power, active broadband/DSL connection, gateway connection, and generic or specific malfunction. In another aspect, no landline is necessary for femto AP 130 operation.

Figure 2:
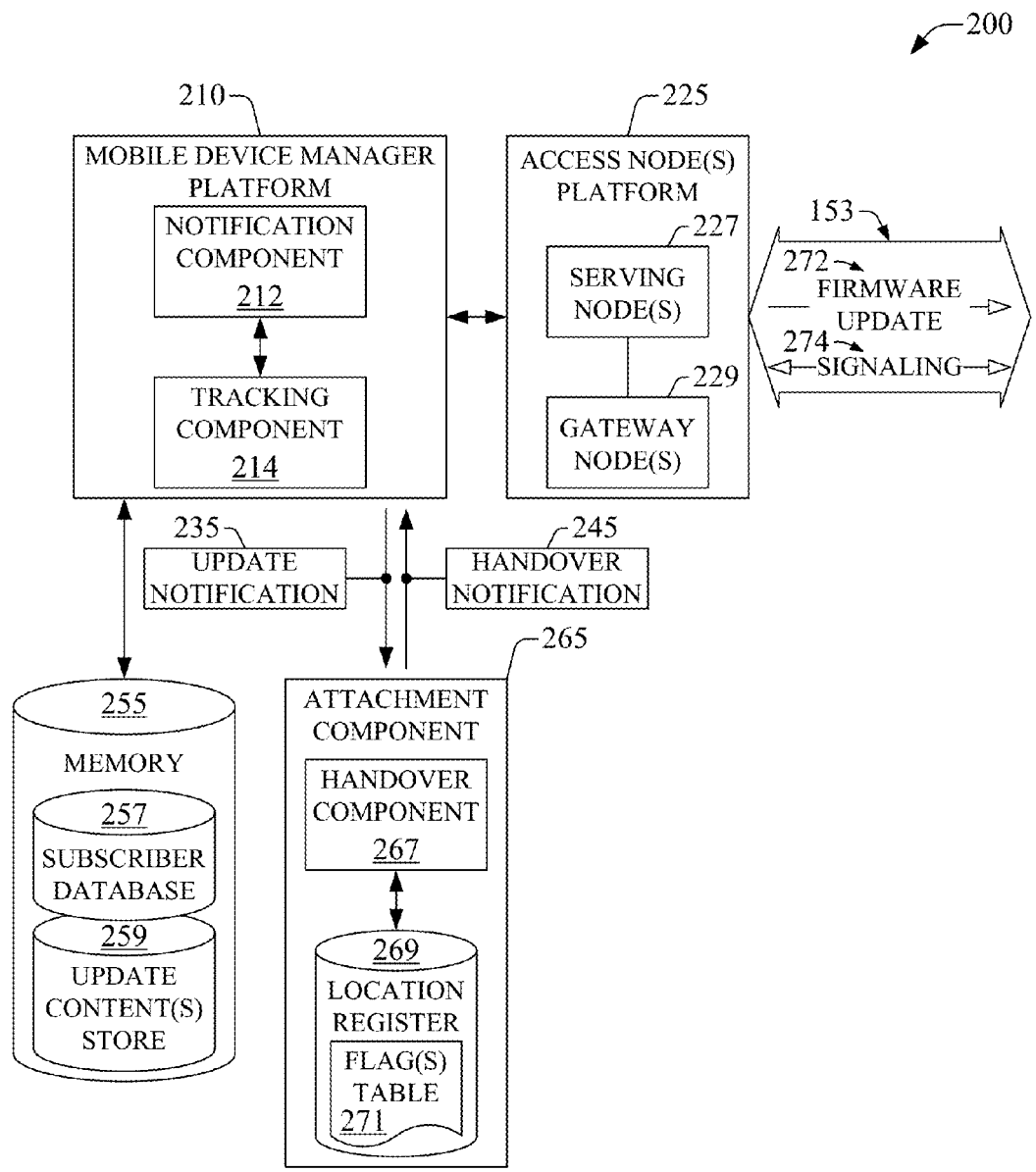
FIG. 2 illustrates a block diagram of an example system that delivers firmware update(s) through a backhaul pipe, which transports traffic and control for a network of femto access points, when a device for which the firmware update(s) is available registers with a femto access point, in accordance with aspects described herein.

FIG. 2 illustrates a block diagram of an example system 200 that delivers firmware update(s) through a backhaul pipe, which transports traffic and control for a network of femto access points, when a device for which the firmware update(s) is available registers with a femto access point.

Example system 200 includes a mobile device manager (MDM) platform 210 that can provide data services (e.g., applications), which can be executed via a wireless application protocol (WAP), and facilitate administration of mobile device(s). Such administration can include firmware updates for both critical and BAU updates. Firmware updates are based at least in part on available update content(s) which can be retained in an update content(s) store 259. For example, with respect to critical updates, content(s) can include security patches; service activation scripts, for example, for activation of services such as voice, voice and data, or data, which can include internet protocol (IP) television, video-streaming and sound-streaming, online gaming, on-the-cloud data storage; etc. In connection with BAU updates, update content(s) can include drivers for add-on or new mobile's functionalities; patches for adjustment of user equipment operation such activation of multi-technology features when a mobile device is capable of operation in various technologies or mode; or the like.

When a firmware content update is available for a device (not shown), MDM platform 210 can exploit a notification component 212 to generate an update notification 235 which can prompt a tracking component 214 to access a subscriber database 257 to determine whether the device for which the update is available can access femto service coverage via one of more femto access points. In an aspect, the device can access femto coverage when it is authorized to attach to a femto access point. Such authorization can be recorded in an access list (not shown) linked to the femto access point and retained in subscriber database 257. Information on a device can be received, or uploaded, in subscriber database 257 at a time a femto access point is provisioned and a set of devices associated with an account for service through the provisioned femto AP is authorized to access femto coverage, e.g., to attach or register with the femto AP; for instance, the devices can belong to the subscriber responsible for the account or subscribers associated thereof such as family members, relatives, friends, coworkers, and so forth. When the device can attain femto coverage, through one or more femto access points, update notification 235 is conveyed to attachment component 265 and a flag is retained, e.g., in flag(s) table 271, in a location register 269 to indicate a firmware update is available for the device. In an aspect, attachment component can be embodied in a home agent. Update notification can convey a unique identifier for the device (e.g., a MSISDN, an IMSI, an ESN) and a set of one or more control bits that can flag the device for update, and characterize the update. In an aspect, update notification 235 can be embodied in a light-weight file (e.g., a cookie file). Handover component 267 can utilize the notification flag associated with update indication 235, as an indication or beacon to generate a handover notification 245, or registration notification, when the device is attached, or registered, with a femto access point. In an aspect, a device can be attached to a femto AP as a result of a successful attachment procedure (e.g., a local area update (LAU)) effected when the device hands off from macro cellular coverage to femto coverage provided through the femto AP. Attachment component 265, through handover component 267, can convey the generated handover notification 245 to mobile device manager platform 210, which can deliver firmware update 272 to the femto AP that serves the device.

In an aspect, handover notification 245 can be at least one of a set of one or more bits, or a light weight file (e.g., a cookie file), which can facilitate generation of a record of updates provided through MDM platform 210.

At least three advantages of delivering firmware update 272 through backhaul link 153 are the following. (I) Reduction of network resources necessary to deliver a firmware content(s) update, which typically is a non-billable data transaction. (II) Increased push or download speed for firmware content(s) update when compared to FOTA update(s) in view of substantive available bandwidth through backhaul backbone of a femto cell network. (III) Improved success rate for firmware content(s) update(s) in view of larger carrier to interference (C/I) ratio in backhaul link 153 with respect to a radio link.

Alternatively, or in addition, when the device is not attached to a femto access point at a time the update notification 235 is received in attachment component 265, available firmware content(s) update can be delayed until handover notification 245 is received in MDM platform 210. To determine firmware content(s) are to be delayed, at least two possible mechanisms can be implemented. (1) MDM platform 210 can trigger a timer (e.g., τ) when notification component 212 delivers update notification 235, if the timer expires prior to reception of a handover notification 245, firmware content(s) update that is BAU update can be delayed until the handover notification 245 is received. (2) Attachment component 265 can deliver a logic NULL handover notification 245 to indicate that the device for which the firmware update is intended is not attached to a femto access point. Thus, the logic NULL notification indicates firmware content is to be delayed; the delay in effect until a non-NULL handover notification 245 is received by notification component 212.

To deliver a firmware update in response to a received non-NULL handover indication 245, MDM platform 210 can convey firmware update 272 to gateway node(s) 229 which relays the firmware update 272 to serving node(s) 227 for communication thereof to the femto access point through backhaul pipe 153. As an example, when example system 200 is exploited in a third generation partnership project (3GPP) Universal Mobile Telecommunication Services (UMTS) network, gateway node(s) 229 can be embodied in gateway general packet radio service (GPRS) support node(s) (GGSN), while serving node(s) 227 can be embodied in serving GPRS support node(s) (SGSN). In addition, access nodes platform 225 can include a tunnel interface (not shown; e.g., a tunnel termination gateway (TTG) in 3GPP UMTS network(s)) which can facilitate packetized communication with disparate wireless network(s) through gateway node(s) 229. In a 3GPP UMTS network(s), gateway node(s) (e.g., GGSN) and tunnel interface (e.g., TTG) comprise a packet data gateway (PDG). It is noted that communication among serving node(s) 227 and gateway node(s) 229 can be facilitated by a reference link (e.g., Gn in EDGE or 3GPP UMTS). It should be appreciated that gateway node(s) 229 and serving node(s) 227 can be part of access node(s) platform 225, which can include access node(s) associated with a macro network platform (e.g., core network) or femto network platform.

When a firmware update 272 is pushed to a femto access point that serves the intended wireless device, MDM platform 210 can receive signaling 274 from the femto access point (not shown) that indicates whether the update was received successfully or it failed. Signaling 272 can be conveyed in a control channel as a set of reserved bits in a frame, or a set of bits in a packet header. When received signaling 274 indicates firmware update has been pushed successfully, flags in location register 269 are released; e.g., notification component can indicate such release through a disparate update notification 235. Conversely, when signaling 274 indicates firmware update 272 is erroneously pushed, MDM platform 210 can implement a retry cycle of Q attempts (where Q is a natural number). Magnitude of Q can be configured by a network operator administrator.

It is noted that example system 200 can include a processor (not shown) which can confer, at least in part, the described functionality(ies) of MDM platform 210 and components therein, and attachment component 265 and components therein, and substantially any, or any, other component(s) or node(s) included is system 200 or functionally connected thereto. In an aspect, the processor (not shown) can execute code instructions stored in a memory, e.g., memory 225, or memory element thereon, to provide such described functionality(ies).

Figure 3:
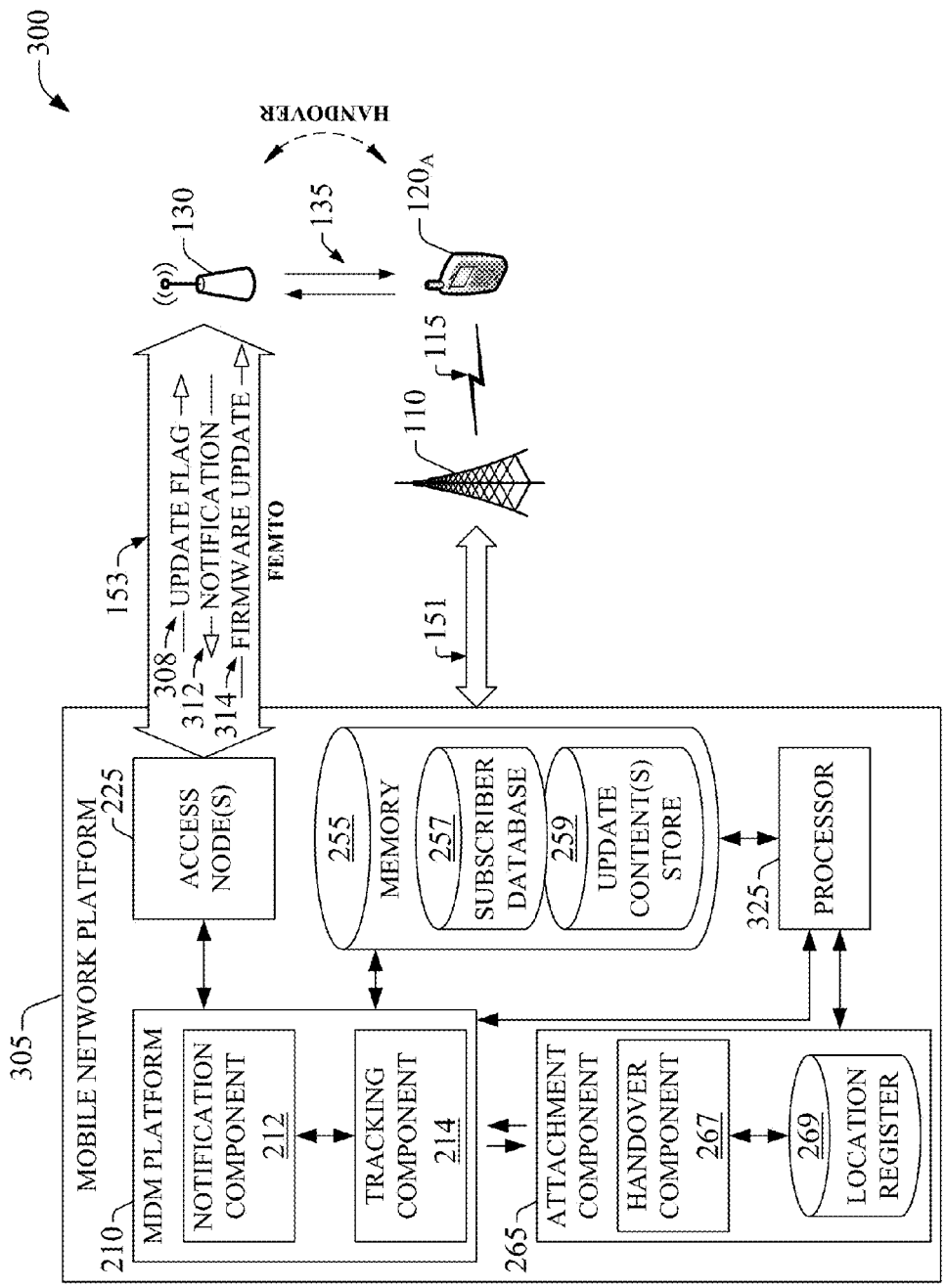
FIG. 3 is a block diagram of an example system that facilitates delivery of femto content(s) upgrade through a backhaul link, which serves a femto access point, when a device for which the firmware update(s) is available registers with the femto access point in accordance with aspects disclosed herein.

FIG. 3 is a block diagram of an example system that facilitates delivery of femto content(s) upgrade through a backhaul link, which serves a femto access point, when a device for which the firmware update(s) is available registers with the femto access point. It should be appreciated that components in example system 400 with like numerals to those in example system 300 have substantially the same, or the same, functionality.

In example system 300, a mobile network platform 305 (e.g., a Core Network in cellular wireless technologies) includes MDM platform 210 that includes notification component 212 and a tracking component 214. In an aspect, when a firmware content(s) upgrade is available for a mobile device (e.g., UE $120_A$), tracking component 214 can identify a set of femto access points that can serve the mobile device within a femto coverage area (e.g., area 125). To at least that end, as discussed above, tracking component can access subscriber database 257 and extract and analyze provisioning information and configured access lists that reveal femto APs that can provide service coverage to the mobile device. Notification component 212 can convey an update flag 308 to one or more of the femto APs in the set of identified femto APs. Update flag 308 can be embodied in P-bit word (with P a natural number), or a lightweight file (e.g., a cookie file), and can be retained within a memory in the recipient femto AP (e.g., femto AP 130). When the mobile (e.g., UE $120_A$) registers with a femto access point (e.g., femto AP 130) that has received an update flag 308 associated with an available firmware content(s) upgrade for the mobile device, a registration notification 312 is received, via backhaul link 153, from the femto AP (e.g., femto AP 130). When MDM network platform 210 receives registration notification 312, it pushes firmware update 314 to the femto AP that retains the update flag 308; the registration notification 312 is received through access node(s) 225. In an aspect, subsequent to a firmware update push, notification 312 can convey an indication whether the firmware content(s) update completed successfully or errors occurred. Such indication can be a set of bits communicated in a control channel, or reserved bits in packet header.

As discussed above, firmware content(s) updates can be delayed until MDM platform 210 receives registration notification 312 as a result of mobile device (e.g., UE $120_A$) handover from macro cell to femto cell served through femto AP 130. To determine firmware content(s) are to be delayed, MDM platform 210 also can employ the at least two possible mechanisms described above; namely: (i) MDM platform 210 can trigger a timer (e.g., τ') when notification component 212 delivers update flag 308, if the timer expires prior to reception of a registration notification 245, firmware content(s) update, which is a BAU update, can be delayed until the handover notification 245 is received. (ii) Femto access point (e.g., femto AP 130) can deliver a logic NULL registration notification 312 to indicate that the device for which the firmware update is intended is not attached to the femto AP. Thus, the logic NULL notification indicates firmware content is to be delayed; the delay in effect until a non-NULL handover notification 245 is received by notification component 212.

It is noted that in example system 300, mobile network platform 305 includes processor 325 which is configured to confer, and can confer, at least in part, the described functionality(ies) of MDM platform 210 and components therein, and attachment component 265 and components therein, and substantially any, or any, other component(s) or node(s) like access node(s) platform 225 included is system 300 or functionally connected thereto as well. In an aspect, processor 325 can execute code instructions stored in a memory, e.g., memory 225, or memory element(s) thereon, to provide such described functionality(ies).

Figure 4:
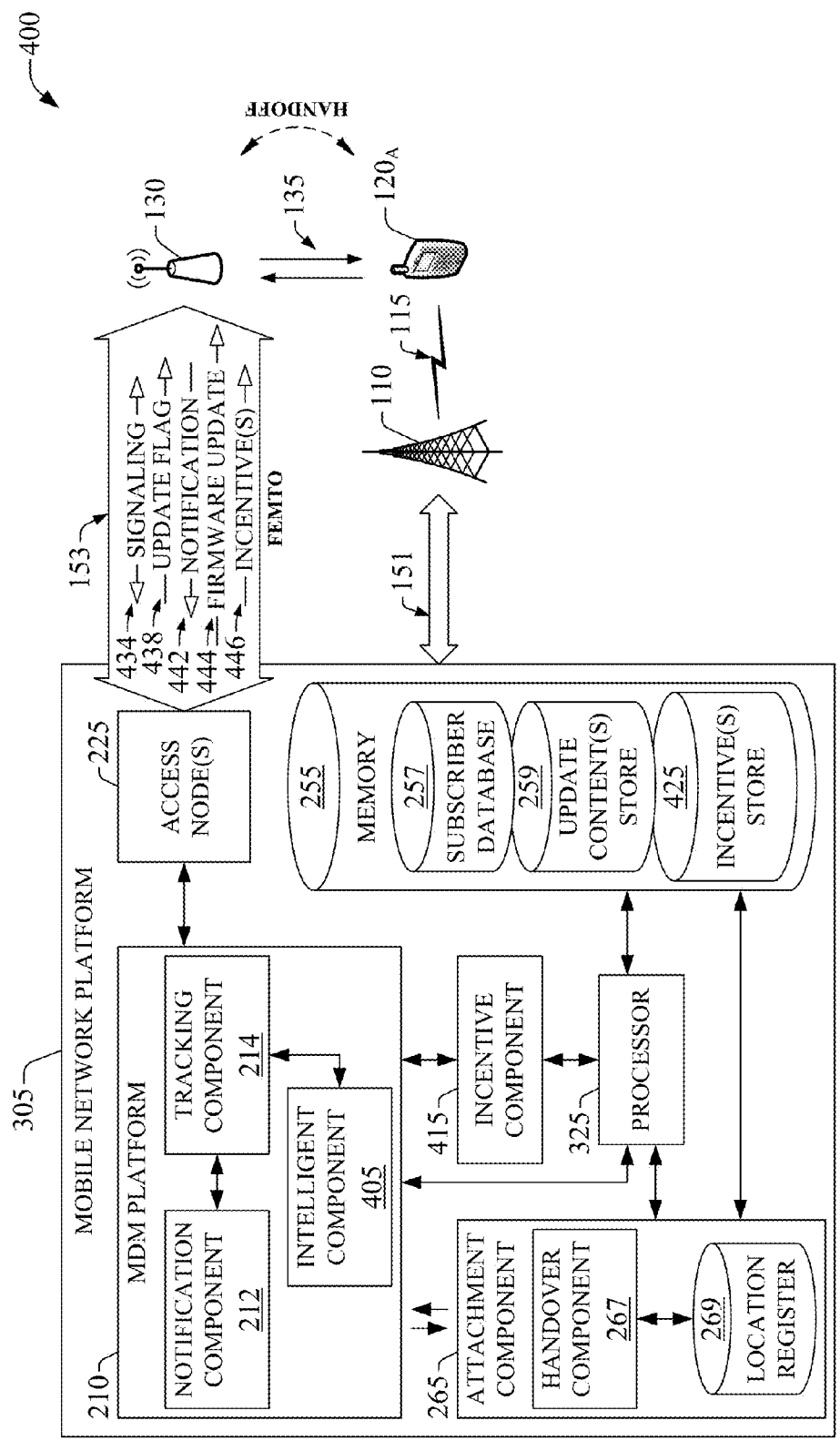
FIG. 4 is a block diagram of an example system that drives inclusion of a femto access point in a pool of femto access points that facilitate firmware content(s) updates conveyed through backhaul backbone of a femto network in accordance with aspects described herein.

FIG. 4 is a block diagram of an example system 400 that drives inclusion of a femto access point in a pool of femto access points that facilitate firmware content(s) updates conveyed through backhaul backbone of a femto network in accordance with aspects described herein. It should be appreciated that components in example system 400 with like numerals to those in example system 300 have substantially the same, or the same, functionality. To drive inclusion of subscribers with associated provisioned femto access point(s), such subscribers are incentivized or motivated to authorize wireless devices, linked to disparate network provider consumers, to access femto service coverage through the provisioned femto access point(s). It should be appreciated that included subscribers and respective femto APs are third-party auxiliary femto cells that facilitate implementation of firmware content updates. In an aspect, third-party femto hubs can implemented or pursued for selected service provider consumers, like premium consumers, consumers with good payment history, non-hotlined consumers, business consumers, or consumers within a predetermined subscriber segment.

It is noted that because firmware content updates are non-billable data transactions directed to maintaining or improving functionality of served mobile devices, a service provider that operates mobile network platform 205 generally has an interest in delivering firmware content updates reliably while minimizing utilized network resources. To incentivize a subscriber, authorization to access femto access point(s), and successfully downloaded firmware content(s) updates, are monetized via various incentives such as a credit for voice communication minutes or data buckets; add-on applications like extra challenge levels in a game, or features in a calendar application; free licensed multimedia such as video clips or songs, or coupons for access thereof; discounted rates for international calls for a predetermined period of time or number of calls; free-of-charge on-the-cloud storage service for a predetermined period of time; discounts on purchases of mobile devices; or the like. An incentive component 415 can generate and administer various mechanisms to accrue incentives in exchange for successfully downloaded firmware update 444 to a femto access point. As an example, downloaded volume of data that is part of a firmware update can be exchanged into a currency or point system internal to mobile network platform 205, and incentives can be credited accordingly. As another example, a flat-rate of accrued points per successful firmware update can be awarded to a subscriber. In an aspect, credits for incentives can be retained in incentive(s) store 425, and one or more subscribers that facilitate firmware update(s) through one or more femto access points associated therewith can redeem incentive(s) with a service operator that administers mobile network platform 205. Alternatively, or in addition, incentive(s) 446 can be delivered via backhaul pipe 153 subsequent to a set of one or more successful firmware update(s) 444. Incentive component also can mitigate fraud, evaluating received notifications (e.g., notification 442) to prevent delivery of incentive(s) upon counterfeit notifications.

In an aspect, to select one or more femto access points to serve as update hubs in exchange of monetized incentives, intelligent component 405 can establish a location pattern for a mobile device (e.g., UE 120$_A$) linked to a subscriber. A location pattern can be determined through analysis of historic attachment data which can be retained in location register 269; intelligent component 405 can conduct the analysis. In an aspect, intelligent component 405 employs historic attachment data to reason or draw conclusions about, e.g., infer a location pattern. Intelligent component 405 can infer a location pattern based at least in part on artificial intelligence, or machine learning, techniques, which apply advanced mathematical algorithms—e.g., decision trees, neural networks, regression analysis, principal component analysis (PCA) for feature and pattern extraction, cluster analysis, genetic algorithm, tabu search, and reinforced learning—to collected attachment information.

In particular, intelligent component 410 can employ at least one of numerous methodologies for learning from data and then drawing inferences from the models so constructed, e.g., Hidden Markov Models (HMMs) and related prototypical dependency models, more general probabilistic graphical models, such as Dempster-Shafer networks and Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein.

With a location pattern for a mobile device, and based at least in part on deployment configuration (e.g., a floor plan) of femto cells, intelligent component 405 can identify a set of femto access points within the location pattern, and extract information for a set of subscribers that are provisioned to utilize the identified set of femto access points. Each subscriber in the set of subscribers can be prompted, e.g., through signaling 434, to opt in to authorize the mobile device (e.g., UE 120$_A$) to access a respective femto access point associated with the prompted subscriber. For a subscriber that opts in to receive incentives in exchange for allowing the mobile device to camp in one or more femto access points associated with the subscriber, MDM platform 210 can configure, via signaling 434, the one or more femto access points to establish privacy settings, or available femto AP resources (e.g., memory space to retain firmware update 144; bandwidth; quality of service; time interval(s) the mobile device is authorized to camp in the femto AP . . . ) directed to firmware update 144 for the mobile device. Such configuration can be negotiated among the one or more femto APs and mobile network platform 205; negotiated configuration can be effected, at least in part, through MDM platform 210.

To promote privacy of subscriber that provides femto AP for firmware update 144, mobile network platform 205, through handover component 267, can allow a mobile device for which a firmware update is available to receive traffic in the femto DL (e.g., DL element of link 135) but not to communicate in the UL (UL element of link 135) except for emergency calls. It should be appreciate that such asymmetric configuration also can ensure, at least in part, privacy of the device since UL traffic is mitigated.

It should be appreciated that firmware update 444 can be conducted partially in each femto access point that is configured to facilitate such firmware update: Notification 442 can trigger firmware update 444 when a mobile device attaches to a femto AP, when femto AP detaches from the femto AP, notification 442 can indicate firmware update 44 is to be halted. Firmware update 444 resumes when the a notification 442 is received as a result the mobile device attached to a disparate femto AP that has previously received an update flag 438. Mobile network platform 305 includes processor 325 which is configured to confer, and can confer, at least in part, the described functionality(ies) of MDM platform 210 and components therein, and attachment component 265 and components therein, and substantially any, or any, other component(s) or node(s), like access node(s) platform 225, included or functionally connected thereto as well. In an aspect, processor 325 can execute code instructions stored in a memory, e.g., memory 255, or memory element(s) thereon, to provide such described functionality(ies).

Figure 5:
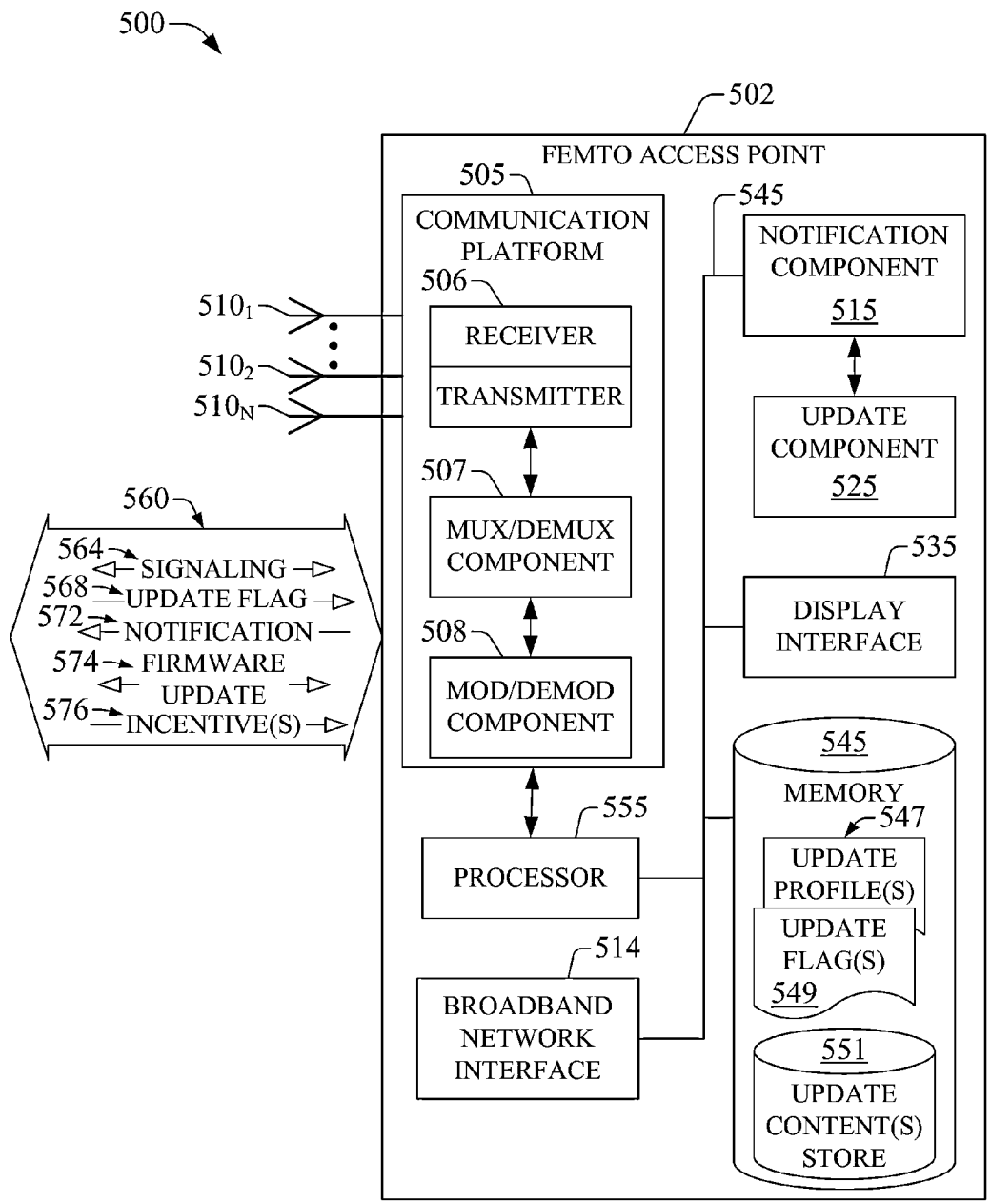
FIG. 5 illustrates an example embodiment of a femto access point that facilitates delivery of firmware update(s) in accordance with aspects described herein.

FIG. 5 illustrates an example embodiment 500 of a femto access point that facilitates delivery of firmware update(s) in accordance with aspects described herein. In example embodiment 500, femto AP 502 can receive and transmit signal(s) (e.g., attachment signaling) from and to wireless devices like femto access points, access terminals, wireless ports and routers, or the like, through a set of antennas 510$_1$-510$_N$ (N is a positive integer). It should be appreciated that antennas 510$_1$-510$_N$ are a part of communication platform 505, which comprises electronic components and associated circuitry that provides for processing and manipulation of received signal(s) and signal(s) to be transmitted. In an aspect, communication platform 505 includes a receiver/transmitter 506 that can convert signal (e.g., signaling 274) from analog to digital upon reception, and from digital to analog upon transmission. In addition, receiver/transmitter 506 can divide a single data stream into multiple, parallel data streams, or perform the reciprocal operation. Coupled to receiver/transmitter 506 is a multiplexer/demultiplexer 507 that facilitates manipulation of signal in time and frequency space. Electronic component 507 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 507 can scramble and spread information (e.g., codes) according to substantially any code known in the art; e.g., Hadamard-Walsh codes, Baker codes, Kasami codes, polyphase codes, and so on. A modulator/demodulator 508 is also a part of communication platform 505, and can modulate information according to multiple modulation techniques, such as frequency modulation, amplitude modulation (e.g., M-ary quadrature amplitude modulation (QAM), with M a positive integer), phase-shift keying (PSK), and the like.

In an aspect, femto access point 502 includes a notification component 515 that can convey an indication, e.g., notification 572, when a mobile device flagged for firmware content(s) update registers with femto AP 502. Records of flagged mobile devices that can be provided femto coverage through femto AP 502 can be retained in memory element update flag(s) 549 within memory 545. In an aspect, update flag(s) 549 can include a unique mobile device identifier, and information related to the available firmware update.

Additionally, femto AP 502 includes display interface 535, which can display functions that control functionality of femto AP 805, or reveal operation conditions thereof; e.g., light-emitting-diode (LED) indicator(s) that convey available firmware content update(s) are available for download. In addition, display interface 812 can include a screen to convey information to an end user; for instance, display interface 812 can display a summary of successful firmware updates carrier out over a predetermined period of time; a message that indicates received incentives (e.g., incentive(s) 576) or credited incentives exchanged for successful firmware updates; and so on. In an aspect, display interface 812 can be embodied in a liquid crystal display (LCD), a plasma panel, a monolithic thin-film based electrochromic display, etc. Display interface 812 also can facilitates data entry (e.g., through a linked keypad or via touch gestures), which can facilitate femto AP 802 to receive external commands or responses such as input associated with configuration of resources for directed to third-party firmware content(s) update(s), and updated profile(s) 547 associated with such configuration.

Update component 525 can facilitate, at least in part, configuration and enforcement of update profile(s) 547, which can include at least one of memory allocated to retain firmware update(s); bandwidth granted for third-party firmware updates for third-party mobile devices; quality of service, such as best effort; time interval(s) third-party mobile device is authorized to camp in femto AP 502; a priority ranking for firmware update push for mobile devices authorized to attach, register, or camp in femto AP 502, e.g., mobile device linked to owner or leaser of femto AP 502 are updated before a third-party mobile device is updated; number of iterations in firmware update retry cycle(s); or the like. In an aspect, for firmware content(s) updates directed to a mobile device within a service account linked to a subscriber to whom the femto AP is provisioned, firmware updates can be downloaded and cached in femto AP, e.g., in memory 545 to the extent memory is available, until the mobile device within the account attaches to the femto AP. At least an advantage of such update mechanism is to reduce signaling with mobile network platform that operates the femto AP (e.g., femto AP 502).

Additionally, update component 525 can assess whether communication resources are available to receive a firmware update 574, and reject a firmware update when resources are unavailable; to at least that end, update component can utilize information received available through at least one of update flag(s) 549 or update profile(s) 547. In addition, update component 525 can push firmware update(s) 272, via communication platform 505, and determine whether delivery of an update succeeds or fails; update component 525 can signal, via signaling 564, delivery success or failure. Furthermore, receive update content(s) can be retained in update content(s) store 551 to facilitate implementation of update retry cycle(s). In an aspect, several firmware content(s) updates can be aggregated as a part of a retry cycle, in case a mobile device for which firmware update(s) detaches from femto AP 502 prior to a successful delivery of firmware content(s) update.

Femto access point 502 includes a broadband network interface 514 that facilitates connection of femto AP 502 to femto network via backhaul link(s) 153, which is included in link 565, which enables incoming and outgoing data flow from and a mobile network platform (e.g., mobile network platform 305). Broadband network interface 514 can be internal (as illustrated) or external to femto AP 502, and it can utilize, at least in part, display interface 532 for end-user interaction and status information delivery; e.g., presentation of log records of firmware updates carried out through femto AP 502.

In addition, femto access point 502 also includes a processor 555 that can confer, at least in part, one or more functionalities described herein to substantially any, or any, electronic component, platform, or interface in femto AP 502. In an aspect, processor 555 can execute code instructions retained in memory 545 to effect, at least in part, the described functionality(ies) of the various components, platform, or interfaces, that reside within femto AP 502. Processor 555 is functionally connected to various components and interfaces within femto AP 502 via a bus 545. Processor 555 also is functionally connected to communication platform 505 and can facilitate operations on data (e.g., symbols, bits, or chips) for multiplexing/demultiplexing, such as effecting direct and inverse fast Fourier transforms, selection of modulation rates, selection of data packet formats, inter-packet times, etc.

Memory 545 also can store data structures, code instructions and program modules, system or device information, code sequences for scrambling, spreading and pilot transmission, femto AP floor plan configuration, and so on. Processor 555 is functionally coupled to the memory 545 in order to store and retrieve information necessary to operate and/or confer, at least in part, functionality(ies) described herein to the various components, platform, and interfaces of femto AP 502.

In view of the example systems described above, example methodologies, or methods, that can be implemented in accordance with the disclosed subject matter can be better appreciated with reference to flowcharts in FIGS. 6-9. For purposes of simplicity of explanation example methodologies, or methods, are presented and described as a series of acts; however, it is to be understood and appreciated that the claimed subject matter is not limited by the order of acts, as some acts may occur in different orders and/or concurrently with other acts from that shown and described herein. For example, it should be understood and appreciated that a methodology could alternatively be represented as a series of interrelated states or events, such as in a state diagram or interaction diagram. Moreover, not all illustrated acts may be required to implement a methodology, or method, in accordance with the subject specification. Additionally, two or more methodologies, or methods, described herein can be enacted in conjunction. Furthermore, it should be further appreciated that the methodologies, or methods, disclosed hereinafter and throughout this specification are capable of being stored on an article of manufacture to facilitate transporting and transferring such methodologies to computers for execution by a processor or for storage in a memory. Further yet, it is noted that a processor that confers, at least in part, functionality to one or more components that can enact one or more example methods described herein also can effect the acts included therein.

Figure 6:
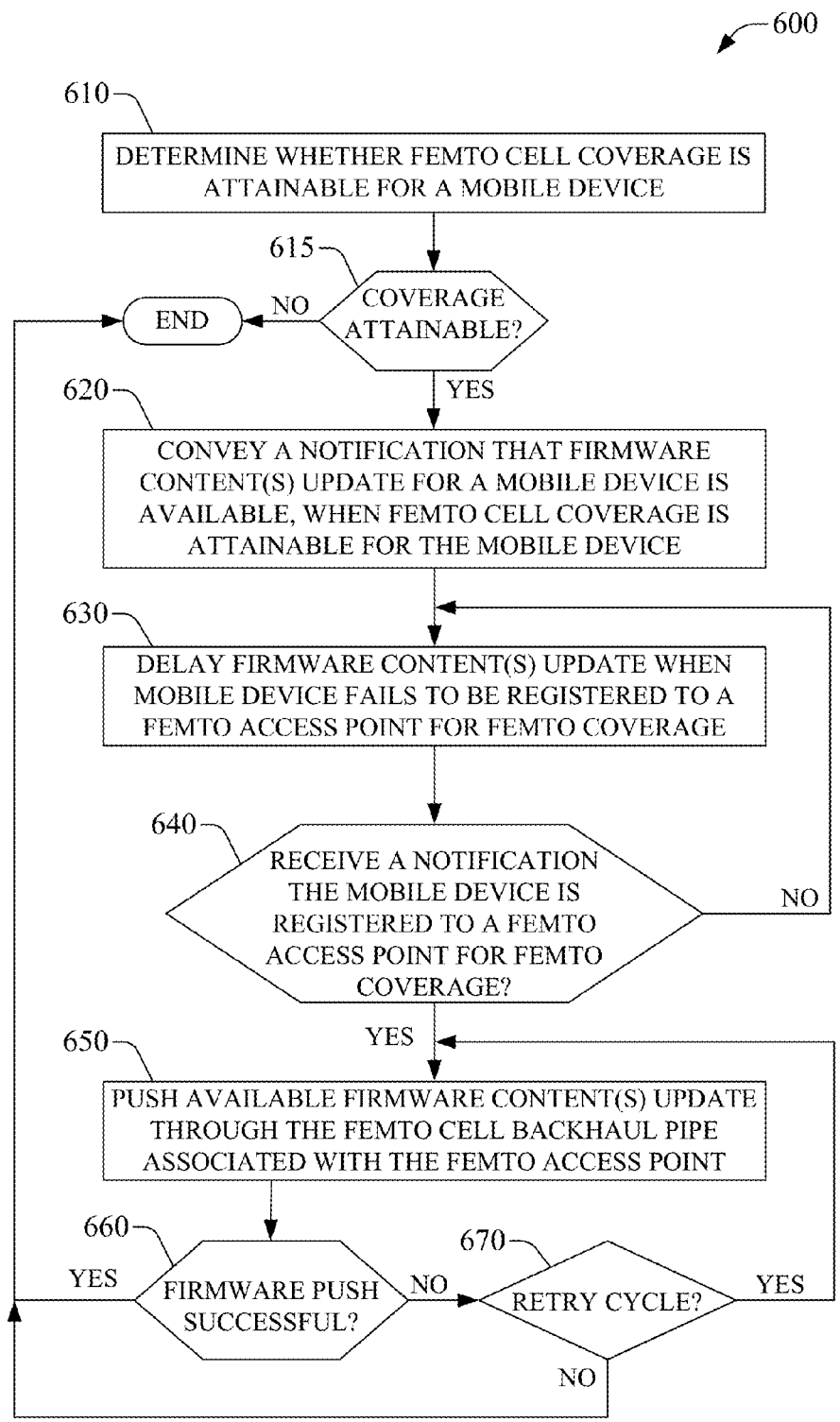
FIG. 6 presents a flowchart of an example method for updating firmware content(s) through a femto cell backhaul pipe in accordance with aspects of the subject innovation.

FIG. 6 presents a flowchart of an example method 600 for updating firmware content(s) through a femto cell backhaul pipe in accordance with aspects of the subject innovation. This example method 600 can be enacted by a component in a wireless network platform (e.g., mobile network platform 305). At act 610, it is determined whether femto cell coverage is attainable for the device. In an aspect, femto cell coverage is attainable when a consumer linked to the device subscribes for femto cell service for a specific location (e.g., area 125). Such determination can be performed by a tracking component (see, e.g., FIG. 2) within the wireless network platform that enacts the method by retrieving information on subscription type(s) for the mobile device as retained in subscriber records in a memory element within the wireless network platform. It is noted that a subscriber not directly linked to the device and with access to femto cell service, e.g., the consumer is associated with a provisioned femto access AP, can authorize the mobile device for femto cell coverage through the femto access point provisioned to the consumer. At 615 it is checked whether femto cell coverage, or femto coverage, is attainable. In the negative case, the subject example method ends. Conversely, at act 620 a notification firmware content(s) update for a mobile device is available. In an aspect, the firmware content(s) update is considered business-as-usual (BAU) non-urgent update. In another aspect, as described above, the notification that firmware content(s) update are available for a mobile device can include a unique identifier for the device (e.g., a MSISDN, an IMSI, an ESN), a set of one or more control bits that can flag the mobile device for update. In addition, the notification can characterize the update; e.g., add-on feature; multi-technology compatibility patch; operational script; etc. In another aspect, the notification also can be embodied in a light-weight file (e.g., a cookie file).

At act 630, firmware content(s) update is delayed when the mobile device is registered to a femto access point for femto coverage. Registration reflects the mobile device is attached to a femto cell and recorded in a location register (e.g., HLR, VLR, TTG) having an updated location (e.g., LAC/RAC) of the mobile device. In an aspect, the mobile device becomes registered for femto cell coverage after macro-to-cellular handover.

At act 640 it is evaluated whether a notification the mobile device registered to a femto access point (e.g., femto AP 130) for femto coverage is received. In the negative case, flow is directed to act 630, and the update remains delayed. In the affirmative case, available firmware content(s) update is pushed through femto cell backhaul pipe associated with the femto access point at act 650. In an aspect, utilization of backhaul pipe can particularly benefit delivery of large (e.g., firmware content(s) in excess of a MB) updates. It is to be noted that at least one advantage of employing the backhaul pipe for delivering firmware content(s) update is that it reduces network resources in the wireless network spent for such non-billable data transaction(s), improves update delivery speed, and improve(s) success rates of these types of actions, with the ensuing improvement in customer experience. At act 660, it is checked whether firmware push was successful. In the affirmative case, firmware content(s) update is concluded. Conversely, at act 670, it is checked whether a retry cycle, e.g., a cycle of Q attempts, with Q a positive integer, is to be implemented. In the positive case, flow is directed to 650, whereas in the negative case, an indication firmware content(s) failed is delivered to the femto access point.

Figure 7:
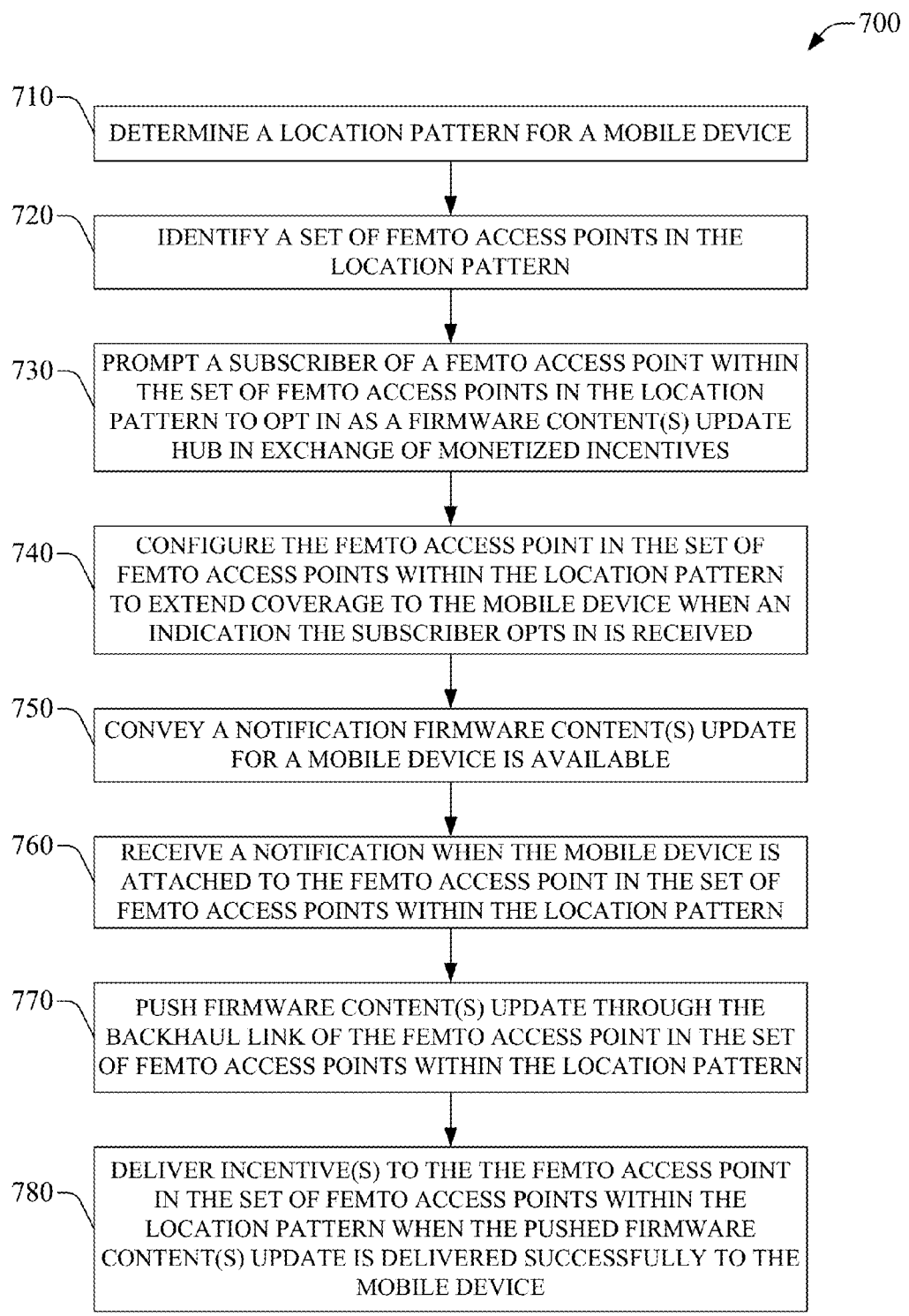
FIG. 7 is a flowchart of an example method for engaging femto access points for delivery of firmware content(s) updates for a mobile device according to aspects described herein.

FIG. 7 is a flowchart of an example method 700 for engaging femto access points for delivery of firmware content(s) updates for a mobile device according to aspects described herein. In an aspect, the subject example method 700 can be enacted by one or more component(s), operating independently or in conjunction, in a wireless network platform (see, e.g., FIG. 4). At act 710 a location pattern is determined for a mobile device. Determination is made based upon historic data collected from a location register (e.g., HLR, VLR) over a predetermined period of time. At act 720, identify a set of femto access points within the location pattern. In an aspect, the identified femto APs can include femto cells neighboring a residence of a subscriber linked to a device that is to receive firmware content(s) update; femto APs deployed within a service area such as a bank, a medical doctor's office, or customer service field office (e.g., an AT&T store); femto APs in the subscriber workplace; or femto cell located in alike areas.

At act 730 a subscriber of a femto access point within the set of identified femto APs within the location pattern is prompted to opt in as a firmware content(s) update hub in exchange for monetized incentives. The subscriber can be prompted through a display interface of the femto AP, wherein a message can offer the subscriber to elect to facilitate the femto AP linked therewith for firmware content(s) update. The prompt through the femto AP can exploit various aural and visual indicia. In another aspect, the subscriber can be prompted through a SMS communication, a MMS communication, an email message, or an instant message delivered to a wireless device associated therewith. Incentives (e.g., incentive(s) 576) can include free voice minutes or data buckets, wherein a data bucket, for example, is a unit of data such as 10 MB and can be utilized for billing reference in data delivery within high-speed technologies (e.g., 4G technology); add-on applications or features for mobile and non-mobile devices served by the femto AP; licensed multimedia such as songs, or movies or video snippets; coupons for service such as free-of-charge roaming minutes and international calling; free on-the-cloud storage service for subscriber data; differentiated rating for a predetermined time interval, configured by the service provider, for specific services; and so on.

At act 740, the femto access point in the set of femto APs within the location pattern is configured to extend coverage to the mobile device when an indication the subscriber associated with the femto AP opts in is received. In an aspect the indication is received through one or more transport mechanisms, based at least in part on the interface employed for prompting the subscriber, as described above in connection with act 730; for instance, the indication can be a user supplementary service data (USSD) code, a SMS communication, a MMS communication, an email communication, etc. Configuration can include at least one of device identifiers for a set of devices authorized to utilize the femto AP, security features to mitigate unauthorized access to content(s) within femto AP such as system files, femto AP configuration information, or the like; quality of service (QoS) to be served through the hub femto AP for firmware content(s) updates; and so on. Configuration of femto AP can proceed in accordance with privacy settings established by the subscriber that opts in. Additionally, configuration also can include negotiating resources for firmware updates, wherein the negotiated resources can include at least one of memory allocated to retain firmware update(s); bandwidth granted for third-party firmware updates for third-party mobile devices; quality of service, such as best effort; time interval(s) third-party mobile device is authorized to camp in femto AP 502; a priority ranking for firmware update push for mobile devices authorized to attach, register, or camp in femto AP 502, e.g., mobile device linked to owner or leaser of femto AP 502 are updated before a third-party mobile device is updated; number of iterations in firmware update retry cycle(s).

At act 750, a notification that firmware content(s) update for the mobile device is available is conveyed. In an aspect, the notification can be a set of one or more bits in a control channel or header of a control packet or frame, or a lightweight file (e.g., a cookie file). At act 760, receive a notification when the mobile device is attached to the femto access point in the set of femto APs within the location pattern. At act 770, firmware content(s) update is pushed through the backhaul link of the femto access point in the set of femto APs within the location pattern. At act 780, incentive(s) are awarded to femto access point within the set of femto APs within the location pattern. Award of incentive(s) can include a fraud mitigation act in which attachment of the mobile device to the femto cell, or femto AP, is confirmed at the mobile network platform level, for example, to mitigate awarding incentives based upon a rogue notification. In addition, as part of awarding incentive(s), an indication of awarded incentive(s) can be conveyed to the femto AP in order for a subscriber linked thereto to become aware of the incentive(s). In an aspect, such indication can include a directive to display visual or aural indicia in a display interface in the femto AP. Indication can be provided at specific times, after incentive(s) have been accumulated, or at the time firmware content(s) has been successfully pushed.

At least one advantage of the subject example method 700 is that transport and delivery of firmware content(s) update is driven to take place through backhaul backbone network, with associated communication resources.

Figure 8:
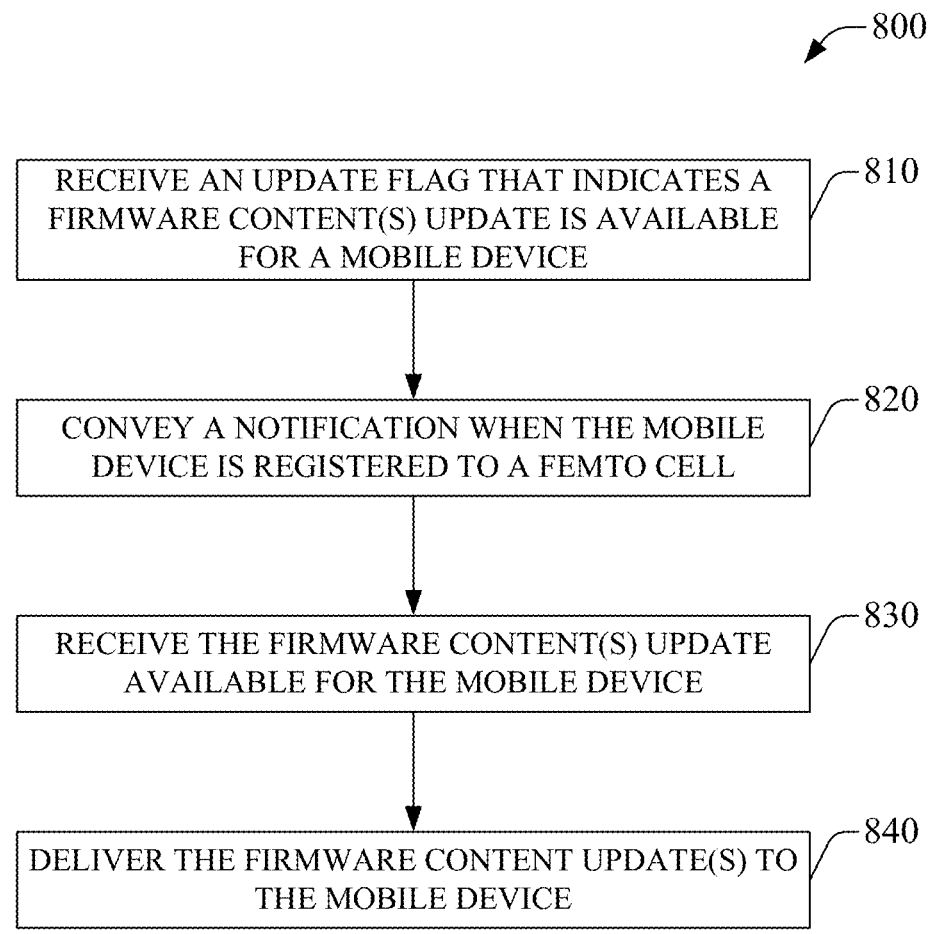
FIG. 8 is a flowchart of an example method for exchanging signaling that facilitates firmware content(s) update for a mobile device according to aspects described herein.

FIG. 8 is a flowchart of an example method 800 for exchanging signaling that facilitates firmware content(s) update for a mobile device according to aspects described herein. The subject example method can be enacted by a network platform component (e.g., attachment component) or network node (e.g., femto AP 130) that can track location and registration status of a mobile device. At act 810, an update flag (e.g., update flag 568), or notification, that firmware content(s) update is available for a mobile device is received. In an aspect, the notification is received by a femto cell access point and can be retained therein. At act 820, a notification is conveyed when the mobile device is registered, or attached, to an access point that serves a femto cell. In an aspect, the notification is embodied in one of a set of K bits (K is a natural number) or a lightweight file (e.g., a cookie file). At act 830, the firmware content(s) update available for the mobile device is received. At act 840, the available firmware content(s) update is delivered to the mobile device.

Figure 9:
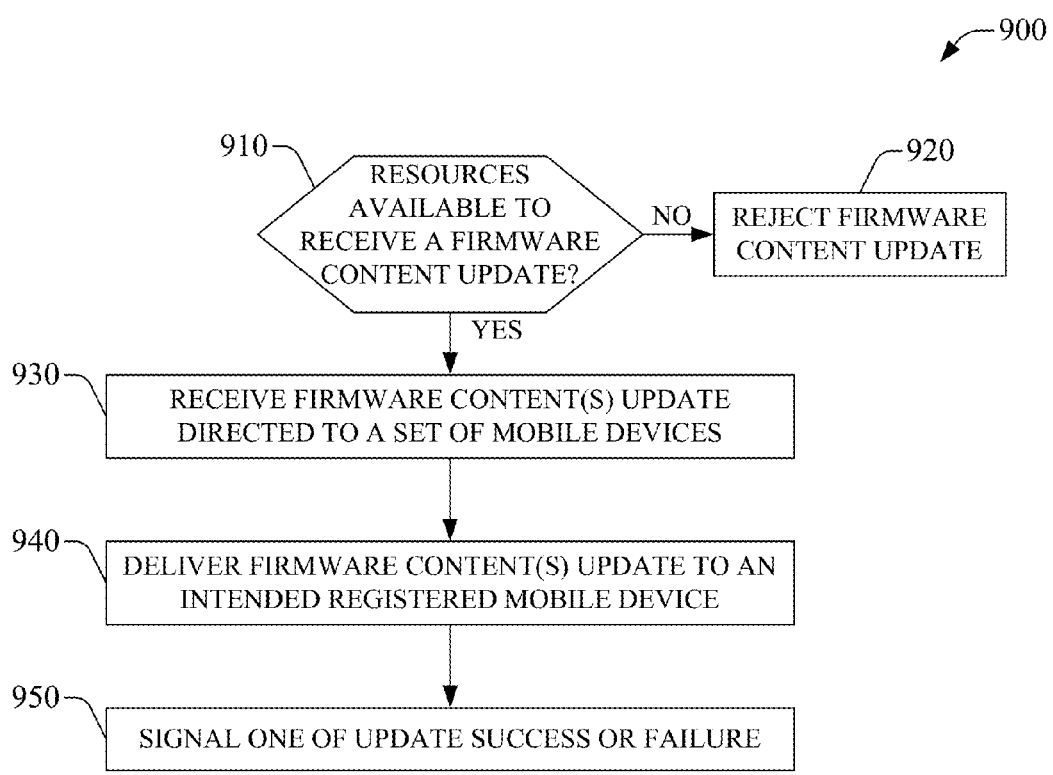
FIG. 9 presents a flowchart of an example method for delivering a firmware content(s) update according to aspects described herein.

FIG. 9 presents a flowchart of an example method 900 for delivering a received firmware content(s) update according to aspects described herein. This example method 900 can be enacted by a femto access point (e.g., femto AP 130), or one or more component therein, e.g., update component 525. At act 910, it is evaluated whether resources are available to receive firmware content(s) update. Resources can include at least one of memory, either internal or external or both, backhaul link bandwidth. When resources are not available, or sufficient, firmware content update(s) are rejected at act 920. Conversely, firmware content(s) updates directed to a set of mobile device is received at act 930; the set of mobile devices include one or more mobile devices. In an aspect, act 910 can occur after firmware update is received. At act 940, firmware content(s) update is delivered to an intended registered mobile device. The mobile device is registered to the femto access point that receives the update and provides femto service. At act 950, one of update success or update failure is signaled. Signal can be embodied in an K-bit work (K is a natural number).

Various aspects or features described herein may be implemented as a method, apparatus, or article of manufacture using standard programming and/or engineering techniques. It is noted that method implementations of aspects of the specification described herein can be effected through a processor, or program modules or code instructions stored in a memory that are executed by a processor, or other combination of hardware and software, or hardware and firmware. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disc (CD), digital versatile disc (DVD), Blu-ray disc (BD) . . . ), smart cards, and flash memory devices (e.g., card, stick, key drive . . . ).

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. For example, information relevant to operation of various components described in the disclosed subject matter, and that can be stored in a memory, can comprise, but is not limited to comprising, subscriber information; femto cell configuration (e.g., devices served by a femto AP) or service policies and specifications; privacy policies; add-on features; and so forth. It will be appreciated that the memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of systems and methods that provide advantages of the subject innovation. It is, of course, not possible to describe every conceivable combination of components or methodologies for purposes of describing the subject innovation, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method comprising:
receiving, by a device comprising a processor, an update flag associated with an availability of a firmware update for a mobile device;
in response to an indication that the mobile device is not registered with a femto cell device of a femto network, delaying, by the device, the firmware update;
sending, by the device, data representing an incentive to the mobile device to transfer a connection of the mobile device from a network device of a wireless network to the femto cell device to receive the firmware update, wherein the incentive comprises a crediting of a user account associated with the mobile device;
receiving, by the device, a notification in response to the mobile device being determined to have registered with the femto cell device;
receiving, by the device, the firmware update available for the mobile device; and
initiating, by the device, delivery of the firmware update to the mobile device based on the availability of the firmware update.

2. The method of claim 1, further comprising:
determining, by the device, whether a resource of the mobile device is available to receive the firmware update.

3. The method of claim 2, wherein the resource comprises at least one of a memory to store the firmware update, a bandwidth, or a quality of service.

4. The method of claim 2, further comprising:
rejecting, by the device, the firmware update based on a condition associated with a bandwidth of the resource being determined not to have been satisfied.

5. The method of claim 2, further comprising:
accepting, by the device, the firmware update based on a condition associated with the resource being determined to have been satisfied.

6. The method of claim 1, wherein the initiating the delivery of the firmware update to the mobile device comprises initiating the delivery of signal data representative of a success of the firmware update.

7. The method of claim 1, wherein the update flag is embodied in a cookie file.

8. A device, comprising:
a processor; and
a memory that stores executable instructions that, when executed by the processor, facilitate performance of operations, comprising:
receiving flag data that indicates that a firmware content update is available for a wireless device associated with a femto cell device;
sending, to the wireless device, incentive data related to an incentive for the wireless device to register with the femto cell device to receive the firmware content update, wherein the incentive comprises a potential crediting of a user account associated with the mobile device;
receiving a notification in response to the wireless device being determined to have attached to the femto cell device;
receiving the firmware content update for the wireless device;
communicating firmware content update data representing the firmware content update to the wireless device;
receiving an indication that the firmware content update has failed; and
sending, to the femto cell device, failure data associated with the indication that the firmware content update has failed.

9. The device of claim 8, wherein the operations further comprise:
configuring an update profile based on the firmware content update.

10. The device of claim 8, wherein the wireless device is a first wireless device, and wherein the operations further comprise:
configuring an update profile based on a bandwidth granted for the firmware content update via a second wireless device.

11. The device of claim 8, wherein the operations further comprise:
configuring an update profile based on a priority ranking of the firmware content update.

12. The device of claim 8, wherein the operations further comprise determining whether a communication resource is available to receive the firmware content update and rejecting the firmware content update in response to determining that the communication resource is unavailable.

13. The device of claim 8, wherein the operations further comprise rejecting the firmware content update based on a condition associated with mobile device resources being determined not to have been satisfied.

14. The device of claim 8, wherein the operations further comprise determining whether delivery of the firmware content update has succeeded.

15. A non-transitory machine-readable storage medium, comprising executable instructions that, when executed by a processor, facilitate performance of operations, comprising:
receiving update flag data comprising information that a firmware content update is available for a mobile device associated with a femto cell device;
sending incentive data, related to an incentive for the mobile device to register with the femto cell device, to the mobile device, wherein the incentive comprises crediting a user account associated with the mobile device;
receiving notification data associated with a notification when the mobile device is registered to the femto cell device;

receiving the firmware content update for the mobile device; and in response to receiving the firmware update, evaluating mobile device resource data associated with a mobile device resource to determine that the mobile device resource is available for the firmware update.

16. The machine-readable storage medium of claim 15, wherein the operations further comprise:

rejecting the firmware content update based on a condition associated with the mobile device resource being determined not to have been satisfied.

17. The machine-readable storage medium of claim 15, wherein the mobile device resource comprise a memory.

18. The machine-readable storage medium of claim 15, wherein the operations further comprise:

tracking the mobile device location relative to the femto cell device.

19. The machine-readable storage medium of claim 15, wherein the operations further comprise:

tracking a registration status associated with a registration of the mobile device to the femto cell device.

20. The machine-readable storage medium of claim 15, wherein the notification is included in a cookie file prior to the receiving the firmware content update.

* * * * *